(12) United States Patent
Strange et al.

(10) Patent No.: US 7,651,647 B1
(45) Date of Patent: Jan. 26, 2010

(54) METHOD FOR PRODUCING HIGHLY CONDUCTIVE BATTERY ELECTRODES

(75) Inventors: Thomas F. Strange, Easley, SC (US); Christopher R. Feger, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 874 days.

(21) Appl. No.: 10/893,775

(22) Filed: Jul. 15, 2004

(51) Int. Cl.
*C04B 35/00* (2006.01)
*H01M 4/02* (2006.01)

(52) U.S. Cl. ....................... 264/104; 429/209
(58) Field of Classification Search ................ 264/104; 429/209
See application file for complete search history.

(56) References Cited

U.S. PATENT DOCUMENTS

| | | | | |
|---|---|---|---|---|
| 4,687,598 A * | 8/1987 | Varma | ................. | 252/519.33 |
| 4,830,940 A | 5/1989 | Keister et al. | ............... | 429/194 |
| 5,262,254 A * | 11/1993 | Koksbang et al. | ........... | 429/306 |
| 5,536,601 A | 7/1996 | Koksbang et al. | ........... | 429/245 |
| 5,558,680 A | 9/1996 | Takeuchi et al. | .......... | 29/623.1 |
| 5,571,640 A * | 11/1996 | Takeuchi et al. | ............ | 429/209 |
| 5,604,057 A * | 2/1997 | Nazri | .......................... | 429/224 |
| 5,660,950 A * | 8/1997 | Bailey | ........................ | 429/212 |
| 5,902,696 A | 5/1999 | Smesko et al. | ............... | 429/142 |
| 6,072,694 A * | 6/2000 | Hahn et al. | .................. | 361/523 |
| 6,130,005 A | 10/2000 | Crespi et al. | ................ | 429/219 |
| 6,225,007 B1 | 5/2001 | Horne et al. | ............. | 429/231.5 |
| 6,232,012 B1 | 5/2001 | Howard et al. | ................ | 429/94 |
| 6,444,360 B2 | 9/2002 | Gan et al. | .................... | 429/215 |
| 6,451,483 B1 | 9/2002 | Probst et al. | ............. | 429/231.7 |
| 6,482,334 B2 | 11/2002 | Kovalev et al. | ............. | 252/500 |
| 6,541,158 B2 | 4/2003 | Frysz et al. | ................. | 429/233 |
| 6,566,077 B1 | 5/2003 | Takeuchi et al. | ............ | 429/219 |
| 2004/0121228 A1* | 6/2004 | Ovshinsky et al. | .......... | 429/131 |
| 2004/0131934 A1* | 7/2004 | Sugnaux et al. | ............. | 429/209 |

* cited by examiner

*Primary Examiner*—Philip C Tucker
*Assistant Examiner*—Michael N Orlando
(74) *Attorney, Agent, or Firm*—Steven M. Mitchell; Theresa A. Takeuchi

(57) ABSTRACT

A method for producing battery cathodes comprises mixing a cathode active material and a conductive polymer such as polyaniline or poly(ethylenedioxythiophene). The conductive polymers are used in lieu of or in addition to conventional conductive additives and binder materials and significantly reduces or even eliminates the need for such conductive additives or binder materials. The resulting cathodes have a greater weight percentage of the active material and a larger volumetric energy density.

23 Claims, No Drawings

METHOD FOR PRODUCING HIGHLY CONDUCTIVE BATTERY ELECTRODES

BACKGROUND OF THE INVENTION

1. Field of the Invention

The present invention relates generally to a method for producing highly conductive battery electrodes. The present invention also relates to a battery electrode produced by the process of the invention, an electrochemical cell or battery incorporating this battery electrode, and an implantable medical device, such as an implantable cardioverter defibrillator (ICD), incorporating an electrochemical cell having this battery electrode.

2. Related Art

In an effort to make a smaller, thinner implantable cardioverter defibrillator (ICD), considerable efforts have been made to miniaturize the electronic components of a device. The chip sets for operating the device have shrunk considerably, as have the high voltage capacitors, due to an increase of energy density by a factor of 2 to 3. The battery for an ICD, on the other hand, still utilizes very similar technology to what has been available over the last 20 years with very slight incremental improvements over time.

Electrochemical cells or batteries are used as the power source in many applications, including implantable medical devices. These electrochemical cells are designed for high current pulse discharge and low or no voltage delay. This design requirement is particularly important in an implantable cardioverter defibrillator (ICD), also referred to as an implantable defibrillator, since an ICD must deliver high voltage shocks to the heart immediately after the detection of arrhythmia. The cells must also have a high energy density to allow for the small size of implantable medical devices.

Typically, such an electrochemical cell or battery comprises a casing housing a positive electrode, a negative electrode, a separator between the positive and negative electrodes, and a conductive electrolyte. The casing of the electrochemical cell is typically of metal, preferably stainless steel. The positive electrode is the cathode during discharge and the negative electrode is the anode during discharge. The cathode is usually a solid having a body of active material comprising carbon fluoride, a transition metal oxide such as silver vanadium oxide (SVO), or other suitable materials known in the art. The cathode active material typically has a high energy density. The anode may comprise an alkali metal such as lithium or compounds and alloys thereof.

U.S. Pat. No. 4,830,940 to Keister et al. discloses a non-aqueous lithium battery with a solid cathode which includes silver vanadium oxide (SVO) as the active material. SVO has high volumetric capacity and high rate capability. SVO shows good current pulsing behavior at various levels of discharge and has a sloping discharge curve in a lithium cell that enables the prediction of end of life of the battery. SVO is also a semiconductor which allows cathodes to require less conductive material, such as carbon, to be added, thereby resulting in higher volumetric energy density. Thus, to increase the volumetric energy density of the cell, it is desirable to have a high percentage of SVO active material in the cathode and a low percentage of conductive material.

One of the limitations of the present silver vanadium oxide technology is in the fabrication of electrodes. The silver vanadium oxide is a ceramic powder that decomposes to other phases rather than reversibly melting, so it is not possible to melt cast the material onto a current collector for electrode fabrication. It is also difficult to sinter the SVO adequately due to the low melting/decomposition temperature. Furthermore, particularly at the early stages of discharge, the SVO is not particularly conductive, which would not allow for good migration of electrons from the current collector to the periphery of the electrode.

In order to overcome this last limitation, as well as the difficulty in sintering the material, a mixture of conductive additives and binders are generally employed to fabricate the cathode into a manufacturable form. U.S. Pat. No. 6,566,007 to Takeuchi et al. describes using acetylene black, carbon black, and/or graphite, as well as metal powders as the conducting additive, and using polymers such as polytetrafluoroethylene (PTFE) or polyvinylidene fluoride (PVDF) in powder form as a binder material. In U.S. Pat. No. 5,558,680 to Takeuchi et al., an exemplary claim indicates that the mixture of active cathode material should be 94% by weight, mixed with 3% by weight binder, and 3% by weight conductive additive. However, the volume fraction is impacted significantly as SVO is considerably denser than either binder or the carbonaceous conductive additive.

Another preferred cathode active material comprises fluorinated carbon represented by the formula $CF_x$, where x is typically between about 0.1 to about 1.9, preferably between about 0.5 to about 1.2. These active materials typically comprise carbon and fluorine, and include graphitic and non-graphitic forms of carbon, such as coke, charcoal, or activated carbon. Fluorinated carbons are particularly preferred cathode active materials in cells intended to be discharged under a light load for extended periods of time, such as for routine monitoring of cardiac functions by an implantable cardiac defibrillator. Like SVO, fluorinated carbons are capable of high volumetric energy density, thereby allowing for small sized implantable medical devices.

For low voltage batteries appropriate for pacemakers utilizing $CF_x$ technology, there is also need for binders and conductive additives. The binders and additives are highly similar as those for SVO batteries, and in U.S. Pat. No. 6,451,483 to Probst et al., with 91% active material and 5% conductive additives and 4% PTFE binder. While this is not as high a volume fraction as for SVO batteries, there is still room for improvement with the addition of greater amounts of active material.

Accordingly, what is needed is a method for fabricating silver vanadium oxide and fluorinated carbon electrodes having higher concentrations of active material.

SUMMARY OF THE INVENTION

The present invention provides an improved method of producing a highly conductive battery electrode. According to one embodiment of the present invention, a method of producing a cathode for use in an electrochemical cell comprises the steps of (a) mixing a cathode active material and a conductive polymer to form a mixture; and (b) forming the mixture of step (a) into a desired shape for said cathode. In another embodiment of the present invention, a method of producing a cathode for use in an electrochemical cell comprises the steps of (a) mixing a cathode active material and a monomer of a conductive polymer; (b) polymerizing said monomer to form a conductive-polymer-active-material; and (c) forming the conductive-polymer-active-material of step (b) into a desired shape for said cathode. Examples of conductive polymers according to the present invention includes polyaniline (PAni) and poly(ethylenedioxythiophene) (PEDOT).

The present invention also provides a cathode produced by the method described herein, an electrochemical cell comprising a cathode produced by the method described herein, and an implantable medical device incorporating an electrochemical cell having a cathode produced by the method described herein.

The cathodes produced according to the methods of the present invention have increased volumetric energy density due to the increase in the amount of active material present and the decrease in the amount of conductive additives and binders added. The cathodes according to the present invention comprises at least about 80% by weight of cathode active material, preferably at least about 95% by weight of active material, more preferably at least about 98% by weight of active material. The incorporation of additional active material per unit volume according to the present invention allows for a reduction in the size of cathodes.

The present invention provides a method for producing cathodes in which it is possible to use the conductive polymer in lieu of conventional conductive additives and binder materials. This results in a simplified mixture of the cathode materials with only one additive (the conductive polymer) needed, reducing complexity in the manufacture of cathodes. The present invention also advantageously provides for the elimination of non-conductive binders which lower the total impedance of the cell. In addition, the conductive polymers used such as PEDOT are highly insoluble and highly stable, allowing for conventional chemistry to remain unchanged if desired.

DETAILED DESCRIPTION OF THE INVENTION

The present invention relates to a method of producing a highly conductive battery electrode, particularly a highly conductive cathode for use in an electrochemical cell. The present invention also provides a cathode produced by the method described herein, an electrochemical cell incorporating a cathode produced by the method described herein, and an implantable medical device comprising an electrochemical cell having a cathode produced by the method described herein.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will also be apparent to a person skilled in the relevant art that this invention can be employed in a variety of other devices and applications.

The present invention provides a modified mixture of materials for battery cathodes that increase the volume fraction of active materials. In lieu of or in addition to using PTFE or PVDF, a conductive polymer such as conductive polyaniline (PAni) or poly(ethylenedioxythiophene) (PEDOT) is used. Preferably, in lieu of conventional binders and conductive additives, a conductive polymer is formed with the active material. Conductive polymers are characterized by pi-conjugated systems having single and double bonds alternating along a polymer chain. The alternating single and double bonds allow the conductive polymer to quickly transport charged species such as an electron along the polymer chain by shifting of double bonds.

Unlike prior processes for fabricating SVO and $CF_x$ electrodes, where both a binder and a conductive additive are required, according to the present invention, a single conductive polymer is added to the active material. In the present application within SVO or $CF_x$ cells, a conductive polymer such as polyaniline or poly(ethylenedioxythiophene) is used in powder form to serve as a binder and conductive additive within the cathode mixture. The SVO can be produced in any variety of ways such as disclosed in U.S. Pat. No. 6,130,005 to Crespi et al., U.S. Pat. No. 6,225,007 to Horne et al., or U.S. Pat. No. 6,566,007 to Takeuchi et al., and is also commercially available from Lorad Chemical Corp. (http://www.loradchemical.com) of St. Petersburg, Fla., as product code BC-579.

Conventionally, conductive polymers have been employed in somewhat aggressive conditions within a battery. For example, U.S. Pat. No. 6,482,334 to Kovalev et al. indicates that conductive polymers can be used to coat current collectors to prevent corrosion of said collectors during battery life. Kovalev et al. discloses methods for preparing non-corrosive conductive organic polymers by treating electroactive, conductive organic polymer compositions with sulfide anions, as well as composite cathodes of such polymers. U.S. Pat. No. 5,536,601 to Koksbang et al. also describes the use and processing of conductive polymers in general to serve as current collectors. However, there has been no prior suggestion to use conductive polymers in conjunction with active material in the fabrication of battery electrodes.

According to the present invention, the conductive polymer can be introduced to the active material in a variety of methods. The materials can be received as a dispersion of PEDOT mixed with polystyrenesulfonate, such as that available from HC Starck under the trademark Baytron® P, or a dispersion of PAni, such as that available from Ormecon GmbH (http://www.ormecon.de). The PEDOT dispersion is in an aqueous mixture and the PAni dispersion is in a variety of solvents. The dispersions can be dried to produce a powder which is subsequently combined with the cathode material, or conversely, can be mixed directly with the cathode active material and subsequently dried prior to pressing.

In one embodiment of the present invention, a method of producing a cathode for use in an electrochemical cell comprises the steps of (a) mixing a cathode active material and a conductive polymer to form a mixture; and (b) forming the mixture of step (a) into a desired shape for said cathode. The cathode active material is preferably silver vanadium oxide (SVO) or fluorinated carbon ($CF_x$). The conductive polymer in step (a) is preferably PAni, PEDOT, or mixtures thereof. In one embodiment of the present invention, the conductive polymer of step (a) is in the form of a powder. In another embodiment of the present invention, the conductive polymer of step (a) is in a liquid dispersion. Preferably, the mixture containing said liquid dispersion is dried prior to forming said mixture into a desired shape for the cathode.

In a preferred embodiment of the present invention, the mixture of cathode active material and conductive polymer comprises at least about 95% by weight of said cathode active material, more preferably at least about 98% by weight of said cathode active material.

According to the present invention, the PAni or PEDOT powder is mixed into the active material and the conductive additive can be significantly reduced or even eliminated. The end result is that a greater weight percent of active material can be used to fabricate finished battery cathodes by either pressing the material directly to an appropriate current collector, or by pressing a sheet of cathode material followed by contacting the material to the current collector. Thus, in one embodiment of the present invention, the mixture of cathode active material and conductive polymer is formed into a desired shape for the cathode by pressing said mixture to a current collector. In another embodiment of the present invention, the mixture of cathode active material and conductive polymer is formed into a desired shape for the cathode by pressing said mixture into a sheet and contacting said sheet to a current collector. Other methods for fabricating the finished battery electrodes could be used as would be apparent to one of ordinary skill in the art without departing from the scope of the present invention. The battery can then be constructed to completion according to a conventional method.

The greater weight fraction of SVO in high voltage, high current batteries results in a significant volume fraction increase in active material which provides a larger volumetric energy density. This will allow for either a longer life battery in the same volume, or a reduction in battery size with no impact on battery life.

According to the present invention, the conductive polymers can also be formed from the corresponding monomers. For example, the PEDOT conductive form can be obtained by combining the EDOT monomer, which can be obtained from Starck under the trademark Baytron® M, with an oxidizing agent, such as iron(III) toluenesulfonate, such as that available under the name Baytron C-B 40. The monomer and oxidizing agent are mixed to obtain the polymer in powder form. This reaction can be performed with the cathode active material in the mixture or separately followed by combination of components. While dispersions are generally the more acceptable form of these polymers, powders can also be obtained when desired.

In one embodiment of the present invention, a method for producing a cathode for use in an electrochemical cell comprises the steps of (a) mixing a cathode active material and a monomer of a conductive polymer; (b) polymerizing said monomer to form a conductive-polymer-active-material; and (c) forming the conductive-polymer-active-material of step (b) into a desired shape for said cathode in the same manner as described above.

The conductive polymer materials of the present invention can be used either exclusively, or in combination with either traditional conductive additives and/or non-conductive binders. The additives can be tailored to obtain the most desirable properties of both formation of robust cathodes and conductivity within the cathode area. In one embodiment of the present invention, the mixture of cathode active material and conductive polymer further comprises conductive additives and binder material in a total amount of less than about 3% by weight, preferably less than about 1% by weight. Examples of conductive additives according to the present invention include, but are not limited to, acetylene black, carbon black, graphite, metal powders, and mixtures thereof. Examples of binder material according to the present invention include, but are not limited to, PTFE, PVDF, and mixtures thereof.

The conductive polymer may also be deposited either electrochemically from the monomer form, or from the dispersion onto the current collector, prior to pressing the cathode mixture, to both further protect the current collector from corrosion as well as to enhance the electrical contact between collector and cathode material. In one embodiment of the present invention, a method of producing a cathode further comprises depositing a conductive polymer onto the current collector prior to pressing the mixture of cathode active material and conductive polymer to said current collector.

The remainder of the battery can be constructed according to conventional methods. Typically, such an electrochemical cell or battery comprises a casing housing a positive electrode, a negative electrode, a separator between the positive and negative electrodes, and a conductive electrolyte. The casing of the electrochemical cell is typically of metal, preferably stainless steel. The positive electrode is the cathode during discharge and the negative electrode is the anode during discharge. A separator prevents internal short circuit conditions and is typically constructed of electrically insulative material. The separator material is also chemically unreactive with the anode and cathode active materials and chemically unreactive with and insoluble in the electrolyte. The separator typically has a degree of porosity that allows the electrolyte to flow through during electrochemical reaction of the cell. The conductive electrolyte serves as the medium for migration of ions between the anode and the cathode electrodes during the electrochemical reactions of the cell. The conductive electrolyte is typically a liquid comprising an alkali metal salt and an aprotic organic solvent. In the case of solid or gel electrolytes, these electrolyte materials may also function as the separator between the cathode and anode.

Each of the positive and negative electrode sides may further comprise a current collector. The current collector conducts the flow of electrons between the electrode active material and the battery terminals. Cathode current collectors may also provide additional support for the cathode active material. The current collector is typically a metal foil or metal mesh comprising nickel, iron, aluminum, stainless steel, or copper foil. U.S. Pat. No. 5,536,601 to Koksbang et al. discloses a cathode current collector comprising a redox active conductive polymer such as polyphenylene, polyaniline, polypyrrole and polythiophene.

The battery can be assembled in a number of ways. For example, an assembly of the battery components can be placed into a preformed casing. The cathode can be formed by pressing the cathode active material to a metal screen section of a cathode current collector and the anode formed by pressing a lithium material to a metal screen section of an anode current collector. A separator structure can then be positioned between, and in contact with, the cathode and the anode. Once the assembly is placed inside the casing with one electrode grounded with the casing while the other electrode is fed through, the cell can then be hermetically sealed and impregnated with a conductive electrolyte.

The battery can also use more exotic separators such as those described in U.S. Pat. No. 5,902,696 to Smesko et al. and corrosion inhibiting current collectors described in U.S. Pat. No. 6,541,158 to Frysz et al. The aforementioned prior art all describe individual cathode plates interleaved between a folded anode, typically lithium pressed onto current collector material. However, alternate designs could include a spiral construction such as that described in U.S. Pat. No. 6,232,012 to Howard et al.

In all examples, the cell assembly can then be placed into a pre-formed metal case, one of the electrodes is then grounded with the case, while the other electrode is fed through using an insulating hermetic seal. The assembly is then impregnated with an appropriate electrolyte such as a composition described in U.S. Pat. No. 6,444,360 to Gan et al., and the fill hole is sealed to yield a hermetic package to prevent degradation of the lithium material or the electrolyte due to moisture.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all patents, patent applications and publications mentioned above are incorporated by reference herein.

What is claimed is:

1. A method of producing a cathode for use in an electrochemical cell comprising the steps of:
   (a) mixing a cathode active material and a conductive polymer to form a mixture, wherein the conductive polymer is selected from the group consisting of polyaniline, polyethylenedioxythiophene, and combinations thereof and wherein said mixture comprises at least about 95% by weight of said cathode active material, said mixture being free from binders other than said conductive polymer; and (b) forming the mixture of step (a) into a desired shape for said cathode, wherein the cathode active material of step (a) is silver vanadium oxide.

2. A method of producing a cathode for use in an electrochemical cell comprising the steps of:

(a) mixing a cathode active material and a conductive polymer to form a mixture, wherein the conductive polymer is selected from the group consisting of polyaniline, polyethylenedioxythiophene, and combinations thereof and wherein said mixture comprises at least about 95% by weight of said cathode active material, said mixture being free from binders other than said conductive polymer; and (b) forming the mixture of step (a) into a desired shape for said cathode, wherein the cathode active material of step (a) is fluorinated carbon.

3. The method of claim 1, wherein said mixture comprises at least about 98% by weight of said cathode active material.

4. The method of claim 1, wherein said forming in step (b) comprises pressing said mixture to a current collector.

5. The method of claim 4, further comprising depositing a conductive polymer onto said current collector prior to pressing said mixture to said current collector.

6. The method of claim 1, wherein said forming in step (b) comprises pressing said mixture into a sheet and contacting said sheet to a current collector.

7. The method of claim 1, wherein said mixture further comprises conductive additives in a total amount of less than about 2% by weight.

8. The method of claim 7, wherein said mixture further comprises conductive additives in a total amount of less than about 1% by weight.

9. The method of claim 7, wherein said conductive additive is selected from the group consisting of acetylene black, carbon black, graphite, metal powders, and mixtures thereof.

10. The method of claim 1, wherein the conductive polymer of step (a) is a powder.

11. The method of claim 1, wherein the conductive polymer of step (a) is in a liquid dispersion.

12. The method of claim 11, wherein step (a) further comprises drying said mixture prior to step (b).

13. An implantable medical device comprising a cathode produced by the method of claim 1.

14. A method of producing a cathode for use in an electrochemical cell comprising the steps of:

(a) mixing a cathode active material and a monomer of a conductive polymer, wherein the conductive polymer is selected from the group consisting of polyaniline, polyethylenedioxythiophene, and combinations thereof and wherein said mixture comprises at least about 95% by weight of said cathode active material, said mixture being free from binders other than said conductive polymer;

(b) polymerizing said monomer to form a conductive-polymer-active-material; and (c) forming the conductive-polymer-active-material of step (b) into a desired shape for said cathode, wherein the cathode active material of step (a) is silver vanadium oxide.

15. The method of claim 14, wherein said polymerizing comprises mixing an oxidizing agent with said cathode active material and said monomer.

16. A method of producing a cathode for use in an electrochemical cell comprising the steps of:

(a) mixing a cathode active material and a monomer of a conductive polymer, wherein the conductive polymer is selected from the group consisting of polyaniline, polyethylenedioxythiophene, and combinations thereof and wherein said mixture comprises at least about 95% by weight of said cathode active material, said mixture being free from binders other than said conductive polymer;

(b) polymerizing said monomer to form a conductive-polymer-active-material; and (c) forming the conductive-polymer-active-material of step (b) into a desired shape for said cathode, wherein the cathode active material of step (a) is fluorinated carbon.

17. The method of claim 14, wherein said conductive-polymer-active-material comprises at least about 98% by weight of said cathode active material.

18. The method of claim 14, wherein said forming in step (c) comprises pressing said mixture to a current collector.

19. The method of claim 18, further comprising depositing a conductive polymer onto said current collector prior to pressing said mixture to said current collector.

20. The method of claim 14, wherein said forming in step (c) comprises pressing said mixture into a sheet and contacting said sheet to a current collector.

21. A cathode produced by the method of claim 14.

22. An electrochemical cell comprising a cathode produced by the method of claim 14.

23. An implantable medical device comprising a cathode produced by the method of claim 14.

* * * * *

UNITED STATES PATENT AND TRADEMARK OFFICE
CERTIFICATE OF CORRECTION

PATENT NO.       : 7,651,647 B1                                            Page 1 of 1
APPLICATION NO.  : 10/893775
DATED            : January 26, 2010
INVENTOR(S)      : Strange et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this

Twenty-third Day of November, 2010

David J. Kappos
*Director of the United States Patent and Trademark Office*